(12) United States Patent
Gilbert et al.

(10) Patent No.: US 7,296,902 B2
(45) Date of Patent: Nov. 20, 2007

(54) OPTO-MECHANICAL FILTER FOR BLENDING OF IMAGES FROM A DIGITAL PROJECTOR

(75) Inventors: Bruno Gilbert, Waterloo (CA); Gord Harris, Georgetown (CA); Brock Eccles, Kitchener (CA)

(73) Assignee: Christie Digital Systems Canada, Inc., Kitchener (CA)

( * ) Notice: Subject to any disclaimer, the term of this patent is extended or adjusted under 35 U.S.C. 154(b) by 253 days.

(21) Appl. No.: 11/189,836

(22) Filed: Jul. 27, 2005

(65) Prior Publication Data

US 2007/0024826 A1    Feb. 1, 2007

(51) Int. Cl.
*G03B 21/14* (2006.01)

(52) U.S. Cl. ..................................... 353/122
(58) Field of Classification Search ............... 353/122, 353/97, 84; 359/892, 888, 889, 722, 723
See application file for complete search history.

(56) References Cited

U.S. PATENT DOCUMENTS

| | | | | |
|---|---|---|---|---|
| 6,017,123 A * | 1/2000 | Bleha et al. | .................. | 353/30 |
| 6,531,230 B1 * | 3/2003 | Weber et al. | ............... | 428/480 |
| 7,019,917 B2 * | 3/2006 | Sato et al. | .................. | 359/704 |
| 2005/0151933 A1 * | 7/2005 | Tsai et al. | ...................... | 353/57 |
| 2006/0077358 A1 * | 4/2006 | Wang | .......................... | 353/97 |
| 2006/0109425 A1 * | 5/2006 | Liang et al. | .................. | 353/31 |
| 2007/0064203 A1 * | 3/2007 | Sawai | ......................... | 353/97 |

\* cited by examiner

*Primary Examiner*—William C. Dowling
(74) *Attorney, Agent, or Firm*—Staas & Halsey LLP

(57) ABSTRACT

A filter mounting apparatus for use with an optical filter placed between a projector lens and screen. The filter mounting apparatus comprises a metallic disk connected to the projector lens, and an assembly magnetically connected to the metallic disk for mounting the optical filter a predetermined distance from the projector lens.

19 Claims, 6 Drawing Sheets

FIG. 5a
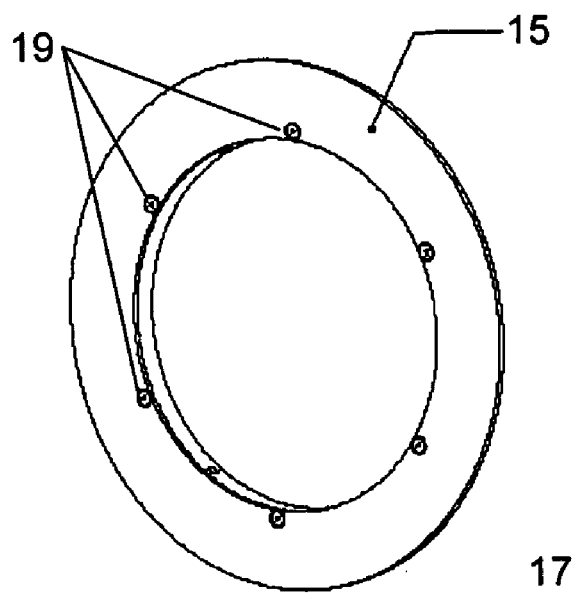
Fig. 5b
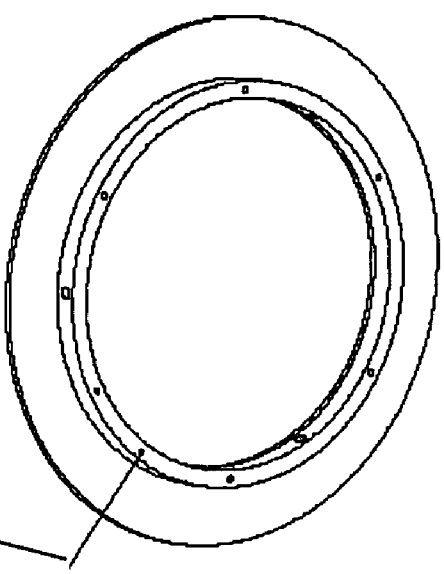
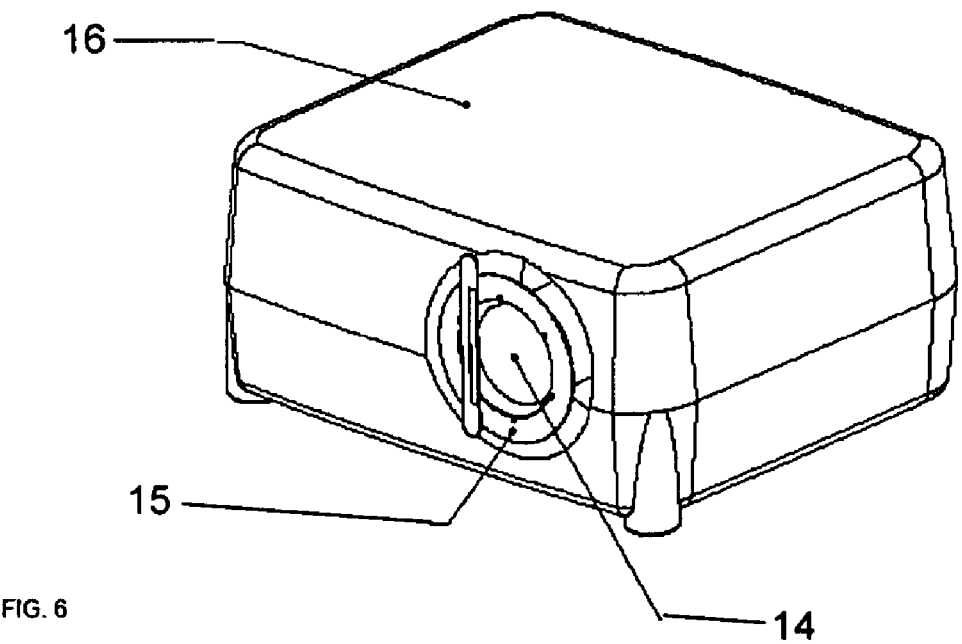
FIG. 6

OPTO-MECHANICAL FILTER FOR BLENDING OF IMAGES FROM A DIGITAL PROJECTOR

BACKGROUND OF THE INVENTION

1. Field of the Invention

The present invention is directed to projection systems, and more particularly to an apparatus for blending of images from multiple digital projectors, as are used, for example, in simulation systems with day/night scenarios.

2. Description of the Related Art

Multiple projection displays are well known in the art, having been used for many years in the film industry to create high-resolution images on large variously shaped screens (e.g. domes, cylinders and toroids, in addition to large flat screens). For example, the CINERAMA system developed in the 1950s used three separate projectors to project three images which were then combined to form a single panoramic image. More recently, video based multiple projector display systems have been used for flight simulators, wherein multiple video screens are placed next to each other to form a large tiled image display.

Because of the difficulty in 'butting' multiple images edge-to-edge, a significant disadvantage of such multiple projector display systems is that the images often do not appear as one single continuous image on the display screen. When multiple images are projected side-by-side and/or top-to-bottom on a single screen, a seam or overlapping region is typically created between the images. Consequently, the final display image appears either as multiple images placed side-by-side with a gap between images or, if the images are made to overlap on a single screen, with a bright line or band there between. When the images of two projectors overlap, the amount of light in the overlapped regions of the images is approximately double the amount of light observed on the screen in regions where only a single projector image resides. Therefore, the region of overlap is brighter than the balance of the image.

The above described problem applies equally to black projector output levels, and is particularly relevant to DMD type displays with a finite black level off state (unlike CRT projectors). Specifically, when displaying a black image, instead of protecting a generally uniformly black area across the entire displayed image the black image tends to brighten in the regions of overlap, giving rise to objectionable artifacts.

Attempts have been made to hide such artifacts, one such example being to electronically reduce light intensity in the regions of overlap to the same brightness levels as the regions of non-overlap. Such practices are usually implemented by adjusting the input video level to obliterate the visibility of the regions of overlap. Although electronic blending does work for CRT projectors (because the "off" state is completely black), it does not work as well for light valve LCD or DMD/DLP type micromirror projectors when generating black images, which is a matter of importance when projecting quality simulated night scenes (such as required, for example, in aircraft and ship simulators). Specifically, because the off-state (i.e. black) brightness is a minimum 000 video code value, electronic reduction of light intensity cannot occur since it is already as low as it can go (zero) so it cannot eliminate the bright region of overlap without adversely affecting the contrast ratio of the projection system. Approaches such as boosting the black level of the non-blended regions degrade contrast rather significantly.

Another prior art solution is set forth in U.S. Pat. No. 6,017,123 (Bleha et al), wherein a blending device is located in the path of light between the projection lens and the screen. The blending device smoothes off-state and on-state illumination levels in the region of overlap without reducing the contrast ratio of the projector. The blending device includes physical devices such as filters, solid masks, and/or a combination thereof as a substitute for electronic blending.

A matte box type solution has also been used wherein a hard mechanical edge slides in and out of the light path of the projector, usually in a strict linear and parallel fashion. Although this solution effectively hides the edge of a projected DMD micromirror device between the imaged area and the non-imaged DMD mask, it cannot create a convincing black blend across the entire overlap region since the density of penumbra (blurred shadow) is fixed by the projector and lens pupil geometry and distance from the lens. Consequently, the matte box type solution does not work well for both dark and light scenes and is not sufficiently controllable, nor does it work well for short throw lenses. Furthermore, it does not handle keystoned projection setups whereby the overlapped regions are not necessarily in the form of vertical or parallel lines.

Another method of creating a softer edge in the overlap region is to use optical filters, fabricated using photomask techniques or solid fabrication techniques such as stereolithography, wherein the filters incorporate comb-like or serrated edges. Typically, these masks control the blending of light by selecting the size, shape, length and density of teeth. The main disadvantages of this method are quality of the light blending, cost, size, weight and the difficulty in customizing for particular lenses, projectors, or for unique projection geometries. Mechanical light attenuators can help disguise the blend edges (similar to tape) but are not as controllable or flexible as a custom optical filter.

A further method involves placing glass plates in front of the lens, either with Neutral Density (ND) graduated filters incorporated therein, or simulated with print screen patterns of various dot density similar to the method used for printing half-screen photographs in newspapers. Various densities may be created by photographically changing dot screen density on a coarse scale, or by variable density dyes, etc. The main disadvantage of such ND filter methods is the loss of light due to back reflection on each glass or plastic surface. For seams (overlapped regions) that involve top, bottom, left and right in a dome simulator this requires a very complex single filter, or for best adjustment flexibility, multiple sheets of glass each of which affects not just the blend overlap region, but the entire image area. Such methods are also very expensive to customize, and heavy to mount.

SUMMARY OF THE INVENTION

It is an aspect of the present invention to provide an apparatus for optical blending of images from multiple projectors which overcomes the disadvantages of the prior art. According to a preferred embodiment, an optical blending device is mounted to the lens of a projector so as to maintain a constant distance from the lens, where the distance is optimized for proper edge blending and temperature considerations, where variations in width, height, size, shape (edge curve), and density of the device are accommodated for optimization with different lens, throw, projector and screen combinations. In one embodiment, the device is magnetically mounted for virtually unlimited flexibility in terms of angling, curving, cutting contours etc. on any side of the image. As such, the apparatus according to the present invention benefits from simplicity, low-cost, no-tool adjustment and zero backlash or play (i.e. high accuracy).

In one variation, the optical blending device is connected to a disk mounted around the lens bezel. In another variation, the optical blending device is connected to a steel frame which, in turn, is attached to the disk by rigid polymer standoffs having magnetized ends. In a further variation, overspill masks are added to the steel frame. In yet another variation, the standoffs are replaced by micro-actuators for independent control of the distance between the blending device and lens.

The above aspects can be attained by a filter mounting apparatus for use with an optical filter placed between a projector lens and screen. The filter mounting apparatus comprises a metallic disk connected to the projector lens, and an assembly magnetically connected to the metallic disk for mounting the optical filter a predetermined distance from the projector lens.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 5A and 5B show front and rear surfaces of a disk for mounting one or more filter holders of FIG. 3, according to a first embodiment;

FIG. 6 shows a filter holder mounted to a projector lens using the disk of FIGS. 5A and 5B;

DETAILED DESCRIPTION OF THE PREFERRED EMBODIMENTS

Figure 1:
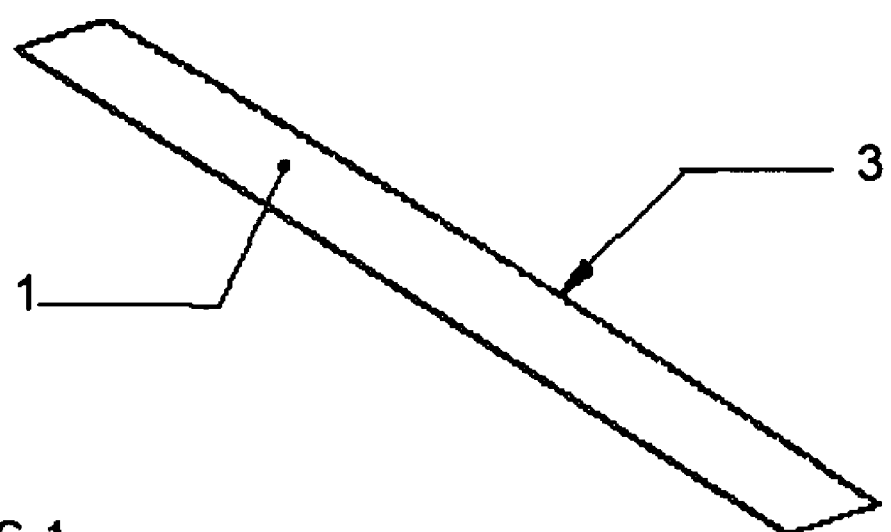
FIG. 1 shows a generally rectangular filter component used in the preferred embodiment.

With reference to FIG. 1, a generally rectangular filter component 1 is shown cut from a commercial transparent polymer (polycarbonate or polyester) film impregnated or coated with a neutral density (ND) color dye, such as described in U.S. Pat. No. 6,531,230 (Weber et al). As is known in the art, one of the longer edges of the filter component is profiled to conform to the shape of the edge of the image as it exits the projection lens of a projector. Typically, the profile follows the shape of a shallow curve 3.

Figure 2:
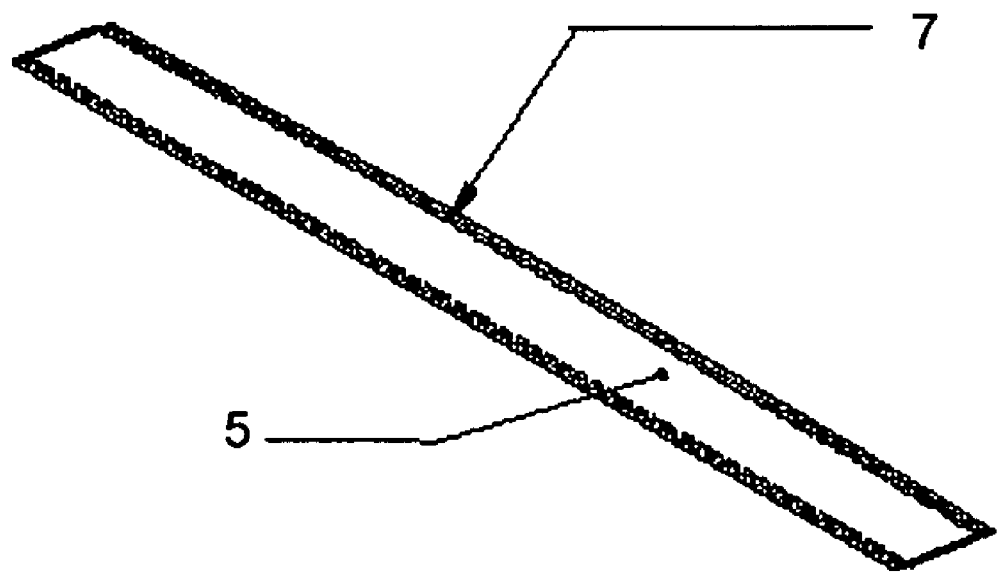
FIG. 2 shows a graduated filter constructed from layers of rectangular filter components shown in FIG. 1.

In FIG. 2, a graduated filter 5 is shown made from layers of cut film filter components of FIG. 1, wherein the curved edges are offset, as indicated by reference numeral 7, to create a 'stepped' graduation of the density of the color dye. The width of the cut filter components and graduated stepped offsets may be varied to best conform to the width of the image area to be blended. Also, the number of layers of cut filter components can be varied (three layers being shown in FIG. 2) to refine the graduation or 'drop-off' profile to best conform to the light intensity of the associated projector. Furthermore, the color density of the ND dies can be specified to optimize filtering the light density of the image projected from different projectors having different power lamps.

Preferably, pre-fabricated ND filter gels are utilized, which can be economically cut, shaped, spaced and created with differing light roll-off slopes or gradients by combining any combination of densities in discrete steps. This provides significant flexibility for customization and very low-cost compared to ND coatings over an entire sheet of glass or plastic, as set forth in U.S. Pat. No. 6,017,123.

Figure 3:
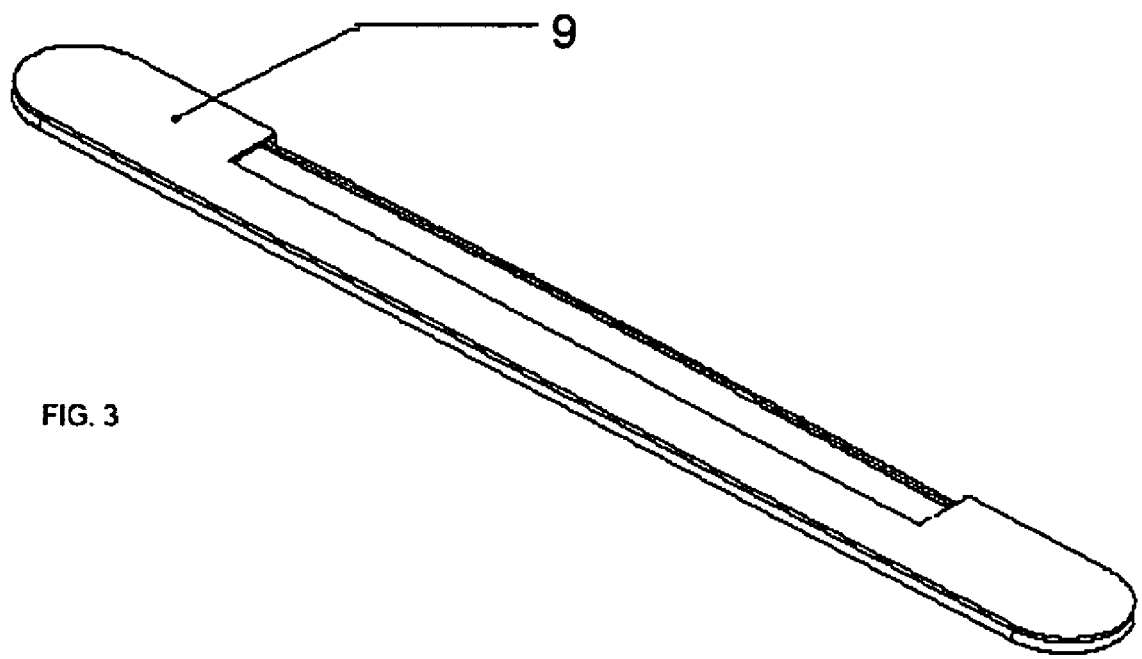
FIG. 3 shows a filter holder for the graduated filter of FIG. 2.
Figure 4:
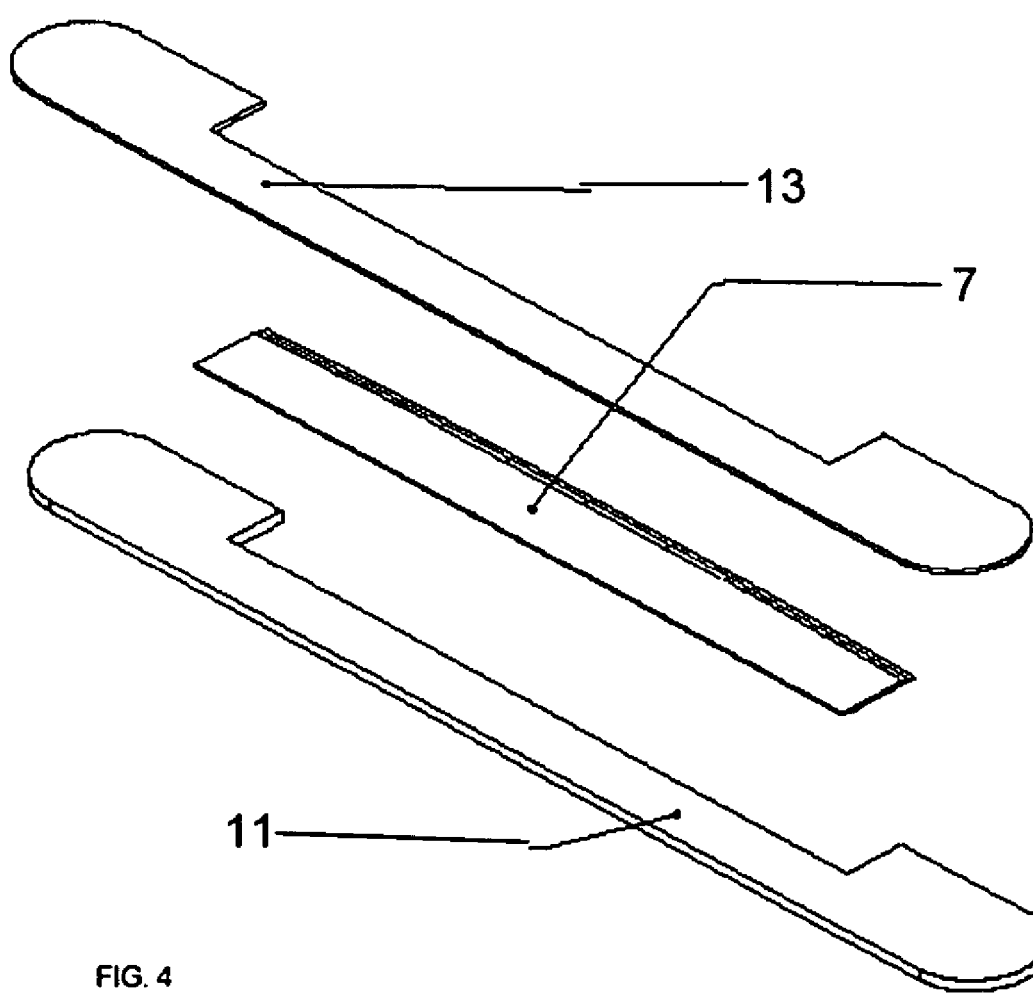
FIG. 4 is an exploded view of the filter holder shown in FIG. 3.

The layered graduated filter is protectively secured within a filter holder 9, as shown in FIGS. 3 and 4. The filter holder 9 preferably comprises a profile-cut strip of rare earth magnetic sheet 11 coated with adhesive on one face, and a profile-cut strip of polycarbonate sheet 13 between which the film filter layers 5 are sandwiched. In a successful prototype, the thickness of polycarbonate sheet 13 was 0.03 inches.

As discussed above, the filters 7 and magnetic filter holders 9 are positioned in front of the vertical and/or horizontal edges of the light images as they exit the projection lens 14 of a projector 16. As shown in FIG. 5, the filters 7 and magnetic filter holders 9 are magnetically connected to a steel disk 15 which, in turn, is secured to the projector lens bezel 14 via a rigid polymer (e.g. Delrin®) ring 17 by nylon tipped set screws 19.

Unlike the optical filter set forth in U.S. Pat. No. 6,017,123, the optical filter 7 does not cover the entire projected image area and therefore does not produce back reflections that may be considered annoying to a user in a simulation environment and also reduces light transmission and MTF due to dust, dirt, fingerprints etc. on the cover glass or plastic. In contrast with U.S. Pat. No. 6,017,123, applicant's filter 7 is constructed from low cost complete ND layers of chosen densities, custom selected to match the ideal density required for good black image generation with any particular combination of lens, projector, screen gain and geometry, with minimal impact on mid tone and light scenes.

Figure 7:
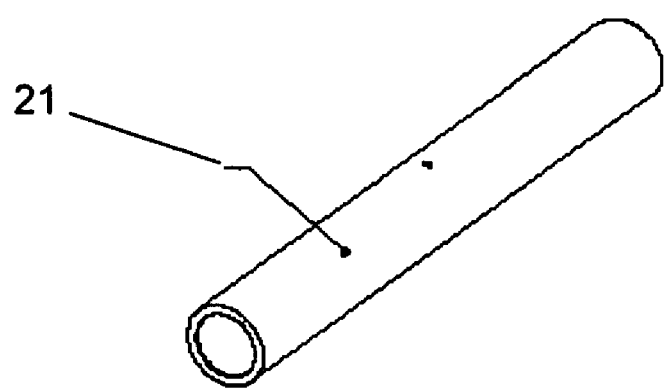
FIG. 7 shows a standoff for mounting a rectangular frame shown in FIG. 8 for supporting one or more filter holders of FIG. 3, according to a second embodiment.
Figure 8:
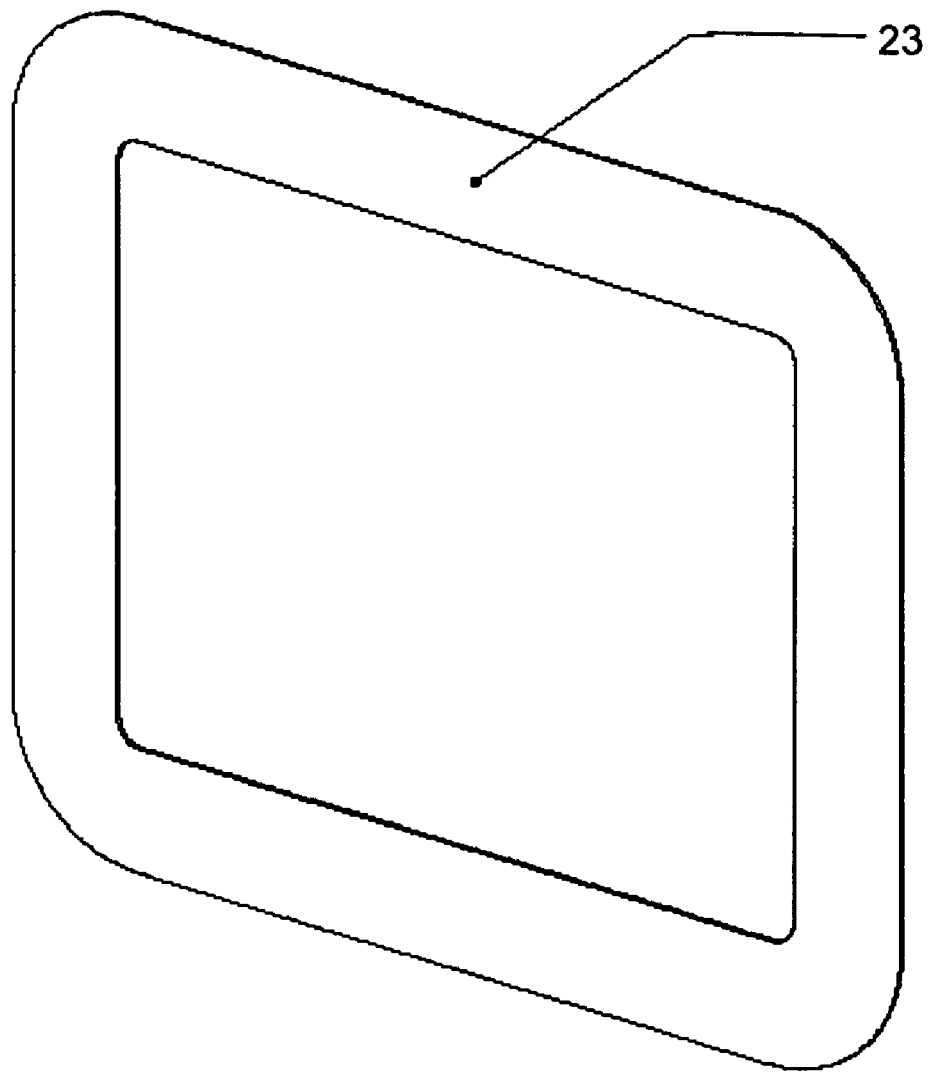
FIG. 8 shows a pair of overspill masks for optional attachment to the disk of FIGS. 5A and 5B over the rectangle or frame of FIG. 8.

The filter 7 may be positioned at the lens bezel 14, as shown in FIG. 6, or further away from the lens 14. Preferably, the filter 7 is located between 0 inches and 6 inches from the lens bezel 14. In order to mount the filters 7 further from the lens bezel, a plurality of standoffs 21 (FIG. 7) may be magnetically attached to the steel disk 15, and a rectangular steel frame 23 may, in turn, be mounted to the standoffs 21 for holding the filters 7, as shown in FIG. 8. The standoffs 21 are also preferably fabricated from rigid polymer (Delrin®) of desired length into the ends of which rare earth magnets are disposed of sufficient strength to attach the standoffs 21 to the steel disk 15 and steel frame 23. The magnetic standoffs 21 enable the rectangular sheet steel frame 23 to be variably positioned around the projected light frustum anywhere in the range of the lens offset (i.e. due to projector lens shift adjustments).

Figure 9:
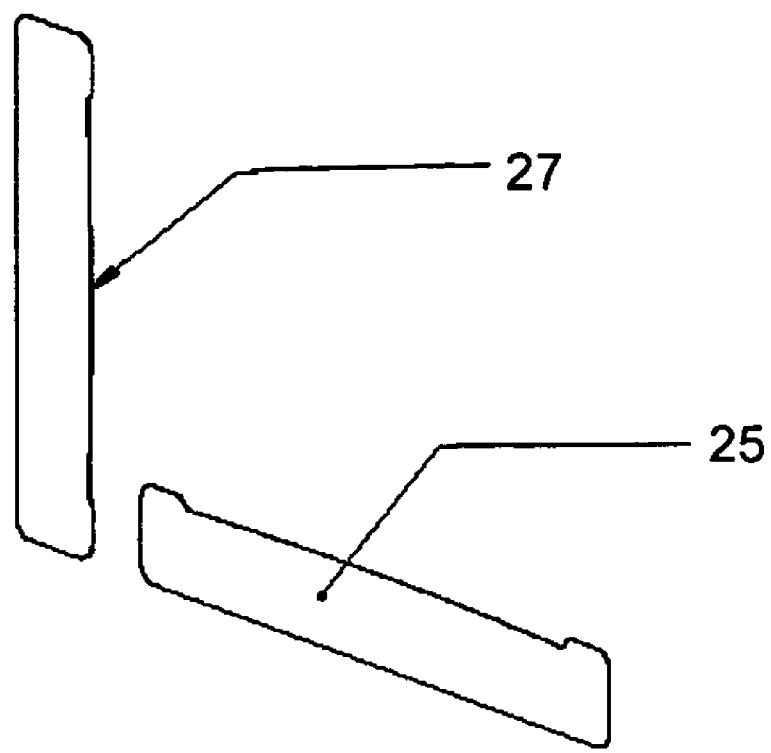

As shown in FIG. 9, thin sheet magnet overspill masks 25 can optionally be adhered to the sheet steel disk 15 or steel frame 23 to mask extraneous or overspill light. As shown by reference numeral 27, the mask edges can optionally be profiled to create a desired image geometry.

Figure 10:
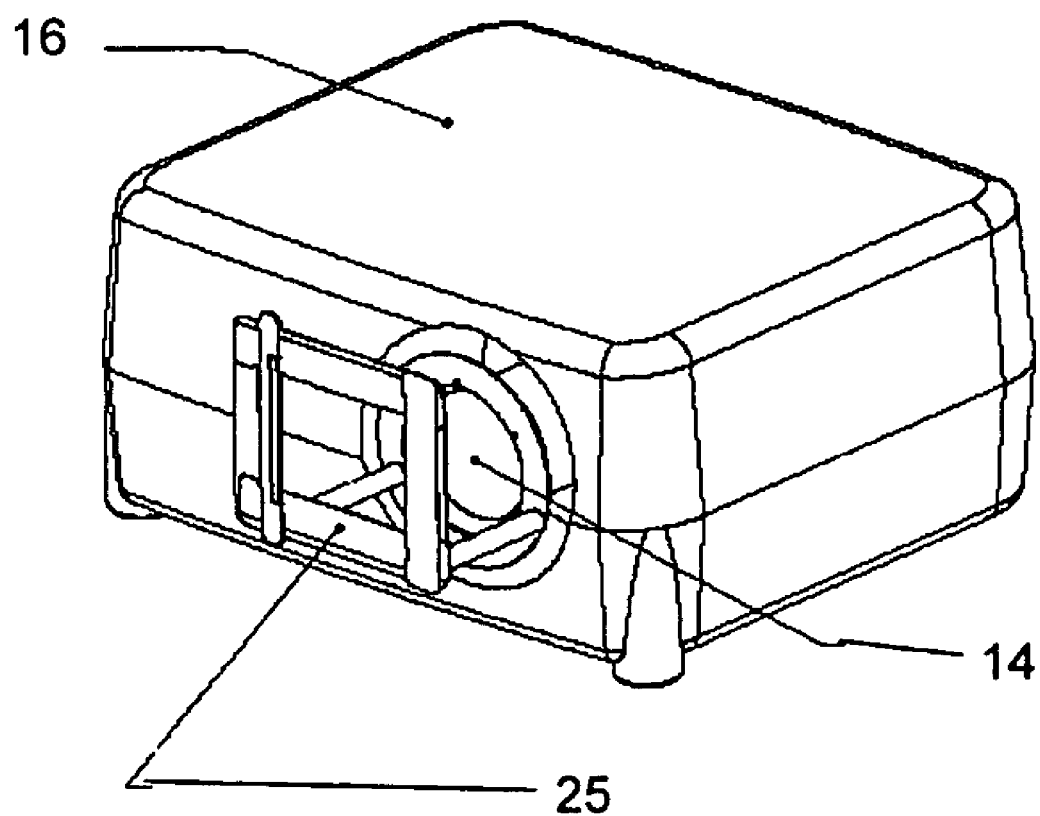
FIG. 10 shows a filter holder with overspill masks mounted to a projector lens using the standoffs of FIG. 7 and rectangular frame of FIG. 8.

FIG. 10 shows a filter mount assembly according to the preferred embodiment, fitted to a digital projector 16 with magnetic standoffs 21, rectangular steel frame 23, overspill masks 25, magnetic filter holder 9 and graduated filter 7.

Additional advantages of the invention may be achieved by selectively controlling the linear position of the optical blend filters 7 in and out of the projected light frustum, for switching from day to night simulation. For example, if no dark scenes (i.e. black) are necessary, such as during daytime flight simulation, the filters 7 can be positioned for best edge blending in non-black conditions or optionally may be completely removed from the image so that only electronic blending is performed. By way of contrast, for nighttime or other dark images, the optical filters 7 are typically required to be fully inserted into the image. For mid-tone scenes, an intermediate filter position may be desirable. Also, for domes (e.g. 3×3 array of projected images), adjustment of the filters 7 may be required both left and right as well as up and down to accommodate four sided seams (top, bottom, left, right).

Figure 11:
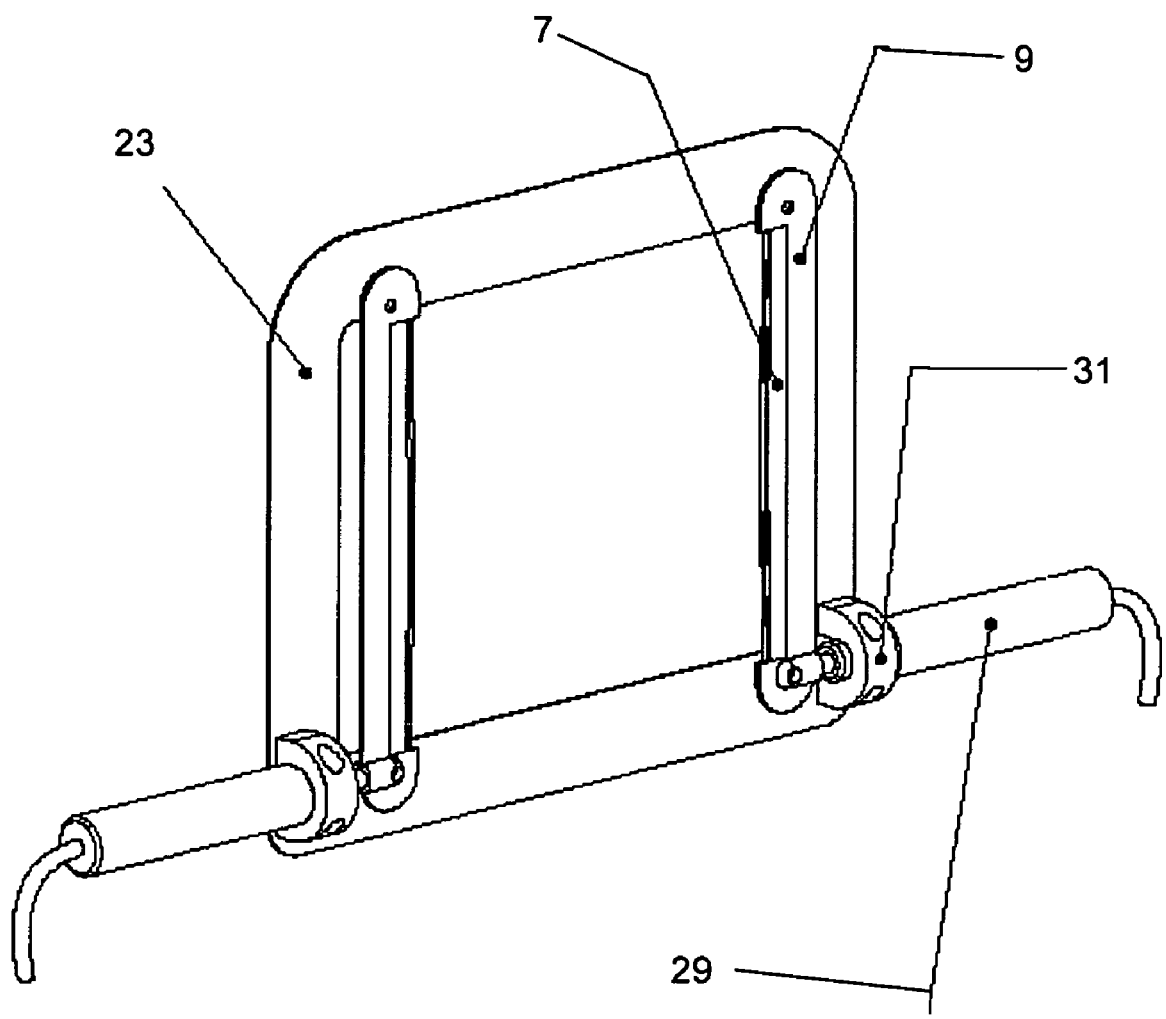
FIG. 11 shows a further alternative embodiment wherein a pair of filter holders may be positioned into repositioned in and out of the projected light frustum by means of an electrically powered actuator.

To that end, FIG. 11 shows an embodiment of the invention for electrically controlling the linear position of the optical filters 7 in an interactive, controlled fashion, rather than simply fixing the position of the filters relative to the lens by magnetic adherence, as discussed in connection with the embodiments above. An electrically powered, incremental micro adjust linear actuator 29 is controlled by an electronic controller (not shown), such as a PC. The filter holders 9 are connected to respective linear actuator mount brackets 31, before moving laterally in and note of the image under control of the actuator 29. Typical image blends from 12.5% to 35% of the image width typically require a filter movement range of from 0.3 inches to 1.5 inches (maximum). Although not shown, it will be appreciated that additional filter holders 9 may be disposed and selectively positioned in a vertical orientation using the depicted methodology to permit construction of systems with up to four independently adjustable blend filters 7 per projector (i.e. top, bottom, right and left), for use with dome simulators or large tiled arrays.

In summary, the filter mounting apparatus of the present invention is characterized by simple and compact deployment (i.e. the assembly is smaller than the envelope of the range of adjustment that it is able to cover), and light weight construction (i.e. no heavy glass components or complex adjustments mechanisms) which enables it to be mounted directly to the lens without putting undue strain on the lens offset adjustment motors. The mounting apparatus is cost effective (few parts, simple to manufacture) and the profile of the filters 7 and the setup of the mount is readily adapted to the requirements of different screen geometries and edge blending (including multiple projector arrays on flat, spherical, toroidal or cylindrical screens with a range of different blend lengths, widths and non orthogonal horizontal and vertical blend relationships).

A person of skill in the art who will appreciate that the linear actuator 29 can be any one of a number of conventional devices, such as a solenoid, a step or motor with lead screw, a DC motor with lead screw, etc. Micro switches may be incorporated at each end of a desired range of motion. Also, in addition to the contemplated lateral horizontal and vertical positioning of the filters holders 9, the electrically powered actuator 29 may also operate on a pivoted lever on which the filters holders 9 are mounted so as to rotate through a 90° rotation.

As an alternative to the electrically powered actuator of FIG. 11, other devices may be employed such as a small rotary motor with belt or gear drive in conjunction with a sliding rod, a computer disk drive motor for positioning the filters 7, etc., all of which would be well known to a person of skill in the art.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. For use with an optical filter adapted for placement between a projector lens and screen, a filter mounting apparatus comprising:
a metallic disk connected to said projector lens; and
an assembly magnetically connected to said metallic disk for mounting said optical filter a predetermined distance from said projector lens.

2. The filter mounting apparatus of claim 1, wherein said assembly further comprises a filter holder having a first sheet and a second sheet between which said optical filter is disposed, said first sheet and second sheet being attached for securing said optical filter there between.

3. The filter mounting apparatus of claim 2, wherein said first sheet and second sheet are attached via adhesive.

4. The filter mounting apparatus of claim 3, wherein said first sheet is fabricated from magnetic material for magnetic connection to said metallic disk, and wherein said adhesive is coated on one side thereof.

5. The filter mounting apparatus of claim 3, wherein said second sheet is fabricated from polycarbonate.

6. The filter mounting apparatus of claim 4, wherein said assembly further comprises a metallic frame to which the first sheet of said filter holder is magnetically attached, and at least one magnetic standoff for magnetically attaching said metallic frame to said metallic disk.

7. The filter mounting apparatus of claim 6, wherein said metallic frame is fabricated from sheet steel.

8. The filter mounting apparatus of claim 6, wherein said metallic frame is rectangular.

9. The filter mounting apparatus of claim 6, wherein said at least one magnetic standoff is generally cylindrical and fabricated from rigid polymer with rare earth magnets inserted in each end.

10. The filter mounting apparatus of claim 1, wherein said metallic disk includes an annular ring for connection to said projector lens.

11. The filter mounting apparatus of claim 10, wherein said annular ring is connected to said projector lens via nylon tipped set screws.

12. The filter mounting apparatus of claim 10, wherein said annular ring is fabricated from rigid polymer.

13. The filter mounting apparatus of claim 6, wherein said assembly further comprises at least one geometrically profiled magnetic overspill mask connected to said metallic frame for masking extraneous light emitted by said projector lens.

14. The filter mounting apparatus of claim 1, wherein said assembly further comprises at least one geometrically profiled magnetic overspill mask connected to said metallic disk for masking extraneous light emitted by said projector lens.

15. The filter mounting apparatus of claim 1, wherein said assembly further comprises at least one electrically powered actuator for positioning said optical filter.

16. The filter mounting apparatus of claim 15, wherein said electrically powered actuator provides lateral movement of said optical filter laterally relative to said projector lens.

17. The filter mounting apparatus of claim 16, wherein said lateral movement is horizontal.

18. The filter mounting apparatus of claim 16, wherein said lateral movement is vertical.

19. The filter mounting apparatus of claim 15, wherein said electrically powered actuator is selected from the group consisting of a solenoid, a step or motor, a rotary motor and a computer disk drive motor.

* * * * *